(12) United States Patent
Ogino et al.

(10) Patent No.: US 7,586,540 B2
(45) Date of Patent: Sep. 8, 2009

(54) IMAGE INTERPOLATION DEVICE AND A FRAME RATE CONVERTER AND IMAGE DISPLAY APPARATUS USING THE SAME

(75) Inventors: Masahiro Ogino, Yokohama (JP); Youichi Igarashi, Mobara (JP); Yoshinori Tanaka, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 649 days.

(21) Appl. No.: 11/260,219

(22) Filed: Oct. 28, 2005

(65) Prior Publication Data

US 2006/0092321 A1 May 4, 2006

(30) Foreign Application Priority Data

Oct. 29, 2004 (JP) ............................. 2004-316051

(51) Int. Cl.
*H04N 7/01* (2006.01)
(52) U.S. Cl. ...................................... 348/448; 348/452
(58) Field of Classification Search ................. 348/441, 348/443, 447, 448, 451, 452, 458, 459, 699, 348/701; 382/236
See application file for complete search history.

(56) References Cited

U.S. PATENT DOCUMENTS

| | | | | |
|---|---|---|---|---|
| 5,353,119 | A * | 10/1994 | Dorricott et al. | 348/446 |
| 5,363,146 | A * | 11/1994 | Saunders et al. | 348/699 |
| 5,886,745 | A * | 3/1999 | Muraji et al. | 348/448 |
| 5,995,154 | A * | 11/1999 | Heimburger | 348/448 |
| 6,288,745 | B1 * | 9/2001 | Okuno et al. | 348/448 |
| 6,509,930 | B1 * | 1/2003 | Hirano et al. | 348/452 |
| 6,611,294 | B1 * | 8/2003 | Hirano et al. | 348/459 |
| 6,900,846 | B2 * | 5/2005 | Lee et al. | 348/459 |
| 7,129,987 | B1 * | 10/2006 | Westwater | 348/441 |
| 7,280,709 | B2 * | 10/2007 | Minami et al. | 382/300 |
| 7,336,316 | B2 * | 2/2008 | Fazzini | 348/448 |
| 2004/0227851 | A1 * | 11/2004 | Min | 348/441 |

FOREIGN PATENT DOCUMENTS

| | | |
|---|---|---|
| JP | 08-223536 | 8/1996 |
| JP | 11-112939 | 4/1999 |
| JP | 11-112940 | 4/1999 |
| JP | 11-284958 | 10/1999 |
| JP | 2002-0027414 | 1/2002 |
| JP | 2003-111080 | 4/2003 |
| JP | 2003-224854 | 8/2003 |
| JP | 2004-008385 | 1/2004 |
| JP | 2005-210697 | 4/2005 |
| WO | WO 99/67952 | 12/1999 |

* cited by examiner

*Primary Examiner*—Paulos M Natnael
(74) *Attorney, Agent, or Firm*—Antonelli, Terry, Stout & Kraus, LLP.

(57) ABSTRACT

More accurate frame-rate conversion is carried out in a simpler circuit configuration. Search areas $SA_{+1}$ and $SA_{-1}$ in each of which the pixel facing the interpolation position $P_0$ of a pixel in an interpolation frame is taken as a central pixel are set in the current frame and immediately previous frame of an image signal, a set of pixels point-symmetrical to the interpolation position $P_0$ in each of the search areas $SA_{+1}$ and $SA_{-1}$ are defined as pixel pairs, and differential luminance values between the individual pixels in the pixel pairs are calculated for each pixel pair. Of all these pixel pairs, only that having the minimum absolute differential value is selected as interpolation pixel pair, an interpolation frame is generated from the current frame and the immediately previous frame on the basis of the interpolation pixel vector of that interpolation pixel pair.

21 Claims, 8 Drawing Sheets

|   | 0 | 1 | 2 | 3 | 4 | 5 | 6 | 7 | 8 | 9 | 10 |
|---|---|---|---|---|---|---|---|---|---|---|----|
| 0 | 0 | 0 | 98 | 124 | 256 | 542 | 121 | 120 | 52 | 4 | 0 |
| 1 | 0 | 0 | 80 | 1121 | 12245 | 24512 | 12453 | 4512 | 12 | 0 | 0 |
| 2 | 0 | 0 | 98 | 5421 | 12154 | 12542 | 12653 | 1211 | 34 | 0 | 0 |
| 3 | 0 | 0 | 55 | 6578 | 15421 | 56872 | 12454 | 12441 | 67 | 0 | 0 |
| 4 | 0 | 0 | 35 | 6855 | 24512 | 52121 | 14587 | 5421 | 89 | 76 | 34 |

IMAGE INTERPOLATION DEVICE AND A FRAME RATE CONVERTER AND IMAGE DISPLAY APPARATUS USING THE SAME

CLAIM OF PRIORITY

The present application claims priority from Japanese application serial no. JP 2004-316051, filed on Oct. 29, 2004, the content of which is hereby incorporated by reference into this application.

BACKGROUND OF THE INVENTION

1. Field of the Invention

The present invention relates to an image interpolation device for changing a frame rate of dynamic-image signals, especially, for conducting frame interpolations, and a frame rate converter and image display apparatus using the image interpolation device.

2. Description of the Related Art

Currently, there are a variety of specifications concerning image signals such as the video signals used for video media and for personal computers (PCs). In general, the image signals defined by the Video Electronics Standards Association (VESA) are widely known, and image formats as many as several types varying in frame rate are defined, even for the VESA standards signals. Unlike this, the kind of image format to be used for display is usually fixed for image display apparatus such as plasma display panels (PDPs) and liquid-crystal displays (LCDs). Therefore, to apply image signals of one of the above-mentioned various image formats to such image display apparatus, it is necessary to convert that image format into a format appropriate for the image display apparatus, and a device that suits this purpose is desired.

In general, when the frame rate of dynamic images is converted, an interpolation processing is carried out in which an interpolation frame is interpolated between original frames of the image signal. As the frame interpolation method, a method based on motion compensation processing which utilizes frame-to-frame motion vectors with attention focused on the current frame and on the previous frame is known. In this method, the motion between frames is identified from motion vector information and an interpolation frame is created using the information.

Several methods are proposed in order to enhance the accuracy of motion vectors in such interpolation. These methods involve, for example, searching for motion vectors in search areas of two split levels, or conducting a smoothing process for removal of inappropriate motion vectors, based on comparisons with respect to surrounding motion vectors (refer to Japanese Patent Laid-open No. 2002-27414, for example).

SUMMARY OF THE INVENTION

Although applying hardware is the simplest way to implement the zeroth-order hold method, this method has the problem in that the occurrence of motion judder (clumsy motions) at the iterative sections of frames results in conspicuous unnaturalness appearing in the motions of images. Also, the linear interpolation method has the problem in that since double after-image disturbance occurs at the edges of images, each entire image gives blurriness (lacks sharpness or clearness).

In addition, in the conventional interpolation method that uses motion compensation processing, pattern matching over the entire search area is required, which, in turn, requires great quantities of arithmetic operations. Consideration must also be given to the correlation between surrounding pixels, and to continuity in a time direction. For these reasons, the conventional interpolation method has the problem that since the arithmetic operations become very complex, a more complex and larger-scale configuration tends to be necessary.

The present invention has been made in view of these problems, and an object of the invention is to provide an image interpolation device adapted to allow more accurate conversion of frame rates with simpler circuit configuration, and a frame rate converter and image display apparatus using the image interpolation device.

In order to attain the above object, an aspect of the present invention is an image interpolation device that generates an interpolation frame to be interpolated between an immediately previous frame of an image signal and a current frame thereof, wherein the image interpolation device includes: a minimum differential pixel pair calculation unit which defines, as pixel pairs, a set of pixels belonging to the immediately previous frame and the current frame and point-symmetrical to one another with respect to an interpolation position within the interpolation frame, calculates differential luminance values of the individual pixels within the pixel pairs, and with the pixel pair of the smallest absolute differential value as a pixel pair of minimum difference, further calculates pixel position information of the pixel pair of minimum difference as an interpolation pixel vector; and an interpolation frame generating unit which uses this interpolation pixel vector to generate interpolation pixels associated with the interpolation position, and thus to generate an interpolation frame formed up of the interpolation pixels.

Additionally, for each of the immediately previous frame and the current frame, the minimum differential pixel pair calculation unit defines a pixel facing the interpolation position within the interpolation frame, as a central pixel, sets a search area for a desired number of pixels, in horizontal and vertical directions with the central pixel as a center, and defines a pixel pair formed up of the pixels located at point-symmetrical positions with respect to the interpolation position, within the search area of the immediately previous frame and the search area of the current frame.

Furthermore, the interpolation frame generating unit determines values of interpolation pixels on the basis of the pixel data forming the pixel pair of minimum difference derived from the interpolation pixel vector, and generates the interpolation frame formed up of the interpolation pixels.

Moreover, the values of the interpolation pixels become luminance values commensurate with the luminance values of the pixels forming the pixel pair of minimum difference, and chroma values commensurate with the luminance values.

In order to attain the above object, another aspect of the present invention is an image interpolation device that generates an interpolation frame to be interpolated between an immediately previous frame of an image signal and a current frame thereof, wherein the image interpolation device includes: a minimum differential pixel pair calculation unit which defines, as pixel pairs, a set of pixels belonging to the immediately previous frame and the current frame and point-symmetrical to one another with respect to an interpolation position within the interpolation frame, calculates differential R-, G-, and B-values of the individual pixels within the pixel pairs, and with the pixel pair of the smallest absolute differential value as a pixel pair of minimum difference, further calculates pixel position information of the pixel pair of minimum difference as an interpolation pixel vector; and an interpolation frame generating unit which uses this interpolation pixel vector to generate interpolation pixels associated with the interpolation position, and thus to generate an interpolation frame formed up of the interpolation pixels.

Additionally, for each of the immediately previous frame and the current frame, the minimum differential pixel pair calculation unit defines a pixel facing the interpolation position within the interpolation frame, as a central pixel, sets a search area for a desired number of pixels, in horizontal and vertical directions with the central pixel as a center, and defines a pixel pair formed up of the pixels located at point-symmetrical positions with respect to the interpolation position, within the search area of the immediately previous frame and the search area of the current frame.

Furthermore, the interpolation frame generating unit defines average R-, G-, and B-values of the interpolation pixel pair of the smallest absolute differential value, as values of interpolation pixels present at the interpolation position, and generates the foregoing interpolation frame.

In order to attain the above object, yet another aspect of the present invention is an image interpolation device that generates an interpolation frame to be interpolated between an immediately previous frame of an image signal and a current frame thereof, wherein the image interpolation device includes: a candidate interpolation pixel vector calculation unit which defines, as pixel pairs, a set of pixels belonging to the immediately previous frame and the current frame and point-symmetrical to one another with respect to an interpolation position within the interpolation frame, calculates differential luminance values of the individual pixels within the pixel pairs, defines a desired number of pixel pairs in normal ascending order of the smallest absolute differential value, as candidate interpolation pixel pairs, and further calculates pixel position information of the candidate interpolation pixel pairs, as interpolation pixel vectors; an edge detection unit which detects edge information from the immediately previous frame and the current frame; a candidate interpolation pixel vector determination unit which, on the basis of the edge information, selects, as interpolation pixel pairs, only the candidate interpolation pixel pairs that satisfy required edge conditions, among all candidate interpolation pixel pairs that have been detected by the candidate interpolation pixel vector calculation unit; and an interpolation frame generating unit which generates interpolation pixels associated with the interpolation position, by using interpolation pixel vectors of the interpolation pixel pairs that have been selected by the interpolation pixel vector determination unit, and thus generates an interpolation frame formed up of the interpolation pixels.

Additionally, an interpolation direction histogram detection unit is provided which identifies and counts the number of appearances of the interpolation pixel vectors within the interpolation pixel pairs selected by the candidate interpolation pixel vector determination unit, for each of the directions indicated by the interpolation pixel vectors, and detects a dominant direction of interpolation pixel vectors, as a direction of a global vector, according to the particular appearance count; wherein the candidate interpolation pixel vector determination unit selects as interpolation pixel pairs, from the candidate interpolation pixel pairs that were selected by the candidate interpolation pixel vector calculation unit, only the candidate interpolation pixel pairs satisfying the foregoing edge conditions and having the same candidate interpolation pixel vector direction as a direction of either of the global vectors, and supplies interpolation pixel vectors of the selected interpolation pixel pairs to the interpolation frame generating unit.

Furthermore, the interpolation direction histogram detection unit includes means for grouping the detected global vectors according to the particular direction, and the candidate interpolation pixel vector determination unit determines the candidate interpolation pixel vectors whose directions are included in the groups assigned to the directions of the global vectors, as the interpolation pixel vectors matching the global vectors.

Moreover, when there are plural candidate interpolation pixel pairs satisfying the edge conditions and having the same candidate interpolation pixel vector direction as either direction of the global vectors, the candidate interpolation pixel vector determination unit calculates a first distance between the pixels within the immediately previous frame or current frame that exist in the direction of either global vector when it is viewed from the interpolation position, and the central pixels within the immediately previous frame or current frame that face towards the interpolation position, and selects, from the candidate interpolation pixel vectors, the candidate interpolation pixel pair closest to the first distance in terms of the distance between the pixels of the particular candidate interpolation pixel pair and the central pixels, as the interpolation pixel pair.

In order to attain the above object, a further aspect of the present invention is an image interpolation device which generates an interpolation frame to be interpolated between an immediately previous frame of an image signal and a current frame thereof, wherein the image interpolation device includes: a search area specification unit which specifies search areas in regards to an interpolation position within the interpolation frame by using the immediately previous frame and the current frame; a candidate interpolation pixel vector calculation unit which defines, as pixel pairs, a set of pixels belonging to the immediately previous frame and the current frame, existing in the search areas specified by the search area specification unit, and point-symmetrical to one another with respect to an interpolation position within the interpolation frame, calculates differential luminance values of the individual pixels within the pixel pairs, defines a desired number of pixel pairs in normal ascending order of the smallest absolute differential value, as candidate interpolation pixel pairs, and further calculates pixel position information of the candidate interpolation pixel pairs, as interpolation pixel vectors; an edge detection unit which detects edge information from the immediately previous frame and the current frame; a candidate interpolation pixel vector determination unit which, on the basis of the edge information, selects, as interpolation pixel pairs, only the candidate interpolation pixel pairs that satisfy required edge conditions, among all candidate interpolation pixel pairs that have been detected by the candidate interpolation pixel vector calculation unit; an interpolation frame generating unit that generates interpolation pixels associated with the interpolation position, by using interpolation pixel vectors of the interpolation pixel pairs that have been selected by the interpolation pixel vector determination unit, and thus generates an interpolation frame formed up of the interpolation pixels; and an interpolation direction histogram detection unit which identifies and counts the number of appearances of the interpolation pixel vectors within the interpolation pixel pairs selected by the candidate interpolation pixel vector determination unit, for each of the directions indicated by the interpolation pixel vectors, and detects a dominant direction of interpolation pixel vectors as a direction of a global vector according to the particular appearance count; wherein the search area specification unit sets the search areas in the global vector direction detected from the interpolation position of the interpolation frame.

Additionally, the minimum differential pixel pair calculation unit defines, as the pixel pairs, a set of pixels belonging to the immediately previous frame and the current frame and point-symmetrical to one another with respect to an interpolation position within the interpolation frame. The minimum differential pixel pair calculation unit also defines, as pixel pairs, a set constituted by the pixels of either the immediately previous frame or the current frame and by the pixels of the immediately previous frame or the current frame that are not point-symmetrical to the pixels of either the current frame or of the immediately previous frame, with respect to the interpolation position within the interpolation frame.

Furthermore, the candidate interpolation pixel vector calculation unit defines, as the pixel pairs, a set of pixels belonging to the immediately previous frame and the current frame and point-symmetrical to one another with respect to an interpolation position within the interpolation frame. The minimum differential pixel pair calculation unit also defines, as pixel pairs, a set constituted by the pixels of either the immediately previous frame or the current frame and by the pixels of the immediately previous frame or the current frame that are not point-symmetrical to the pixels of either the current frame or the immediately previous frame, with respect to the interpolation position within the interpolation frame.

In order to attain the above object, a frame rate converter as a further aspect of the present invention, interpolates an interpolation frame that was generated by either of the above image interpolation devices, between the above-mentioned immediately previous frame and the above-mentioned current frame, and thus changes a frame rate of the image signal.

In order to attain the above object, an image display apparatus as a further aspect of the present invention makes an image display of the image signals whose frame rate was changed by the frame rate converter outlined above.

According to the present invention, since pixel pairs closely correlated with one another with respect to an interpolation position within an interpolation frame, between an immediately previous frame of image signals and a current frame thereof, are detected and interpolation pixels of the interpolation frame are generated using the pixel pairs, motions of images between these frames can also be detected with a simple circuit configuration, and highly accurate interpolation frames responding to these motions can be generated.

Also, since a next interpolation frame can be generated considering edge information and motion information of the immediately previous interpolation frame, it is possible to generate a more accurate interpolation frame, to suppress erroneous detection, and thus to implement highly accurate frame rate conversion of image signals.

BRIEF DESCRIPTION OF THE DRAWINGS

These and other features, objects, and advantages of the present invention will become more apparent from the following description when taken in conjunction with the accompanying drawings, wherein.

DETAILED DESCRIPTION OF THE PREFERRED EMBODIMENTS

Embodiments of the present invention will be described below with reference to the accompanying drawings.

Figure 1:
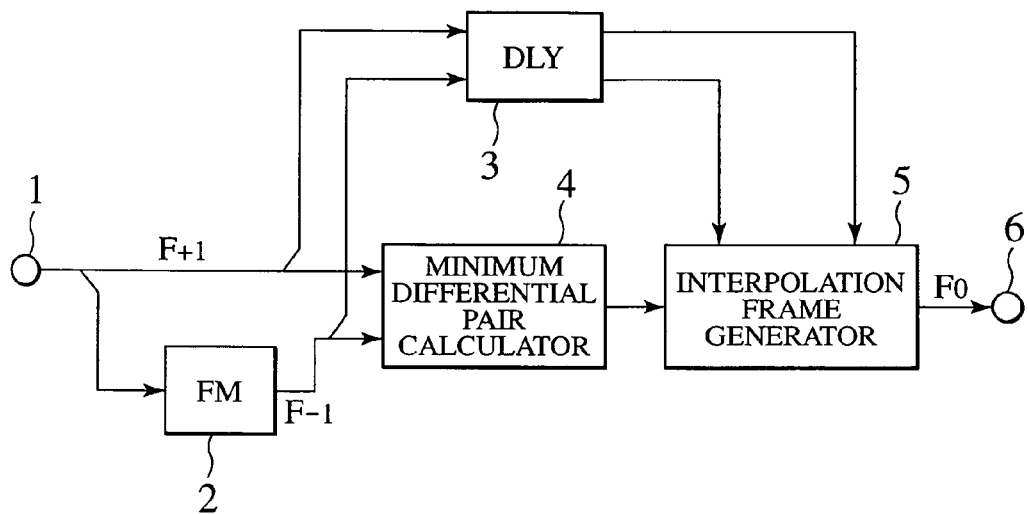
FIG. 1 is a block diagram showing a first embodiment of an image interpolation device according to the present invention.

FIG. 1 is a block diagram showing a first embodiment of an image interpolation device according to the present invention. Reference numeral 1 in FIG. 1 denotes an input terminal, 2 a frame memory, 3 a delay controller, 4 a minimum differential pixel pair calculator, 5 an interpolation frame generator, and 6 an output terminal.

In the figure, a frame of the image signal input from the input terminal 1 is supplied as a current frame $F_{+1}$ to the frame memory 2 and the minimum differential pixel pair calculator 4. The frame memory 2 delays the current frame $F_{+1}$ by one frame period, and the frame read out from the frame memory 2 is supplied to the minimum differential pixel pair calculator 4 as a frame $F_{-1}$ that immediately precedes the current frame $F_{+1}$ input from the input terminal 1.

At the minimum differential pixel pair calculator 4, position information on pixel pairs each for generating an interpolation frame from the current frame $F_{+1}$ and the immediately previous frame $F_{-1}$ is detected (hereinafter, the position information is referred to as the interpolation pixel vectors). The interpolation pixel vectors are supplied to the interpolation frame generator 5. On the basis of the interpolation pixel vectors, the interpolation frame generator 5 processes the current frame $F_{+1}$ supplied after being delayed by the relay controller 3, and the immediately previous frame $F_{-1}$, and generates interpolation frame $F_0$. The interpolation frame $F_0$ is output from the output terminal 6, then supplied to a frame interpolation circuit not shown, and interpolated between the current frame $F_{+1}$ and the immediately previous frame $F_{-1}$.

Although no description will be given in the following embodiments, after the frames input and the generated interpolation frame have undergone time base compression, the above frame interpolation circuit interpolates the interpolation frame between the two adjacent frames. This interpolation process creates an image signal that has been converted into a frame rate appropriate for an image display apparatus. This means that the image interpolation device and the frame interpolation circuit constitute a frame rate converter. Also, the image signal that has thus been generated in the frame rate converter by interpolating the interpolation frame and converting the signal into a frame rate is supplied to an image display apparatus such as a PDP or LCD, where the signal is then used for image display.

Processing by the minimum differential pixel pair calculator 4 is described below.

Figure 2:
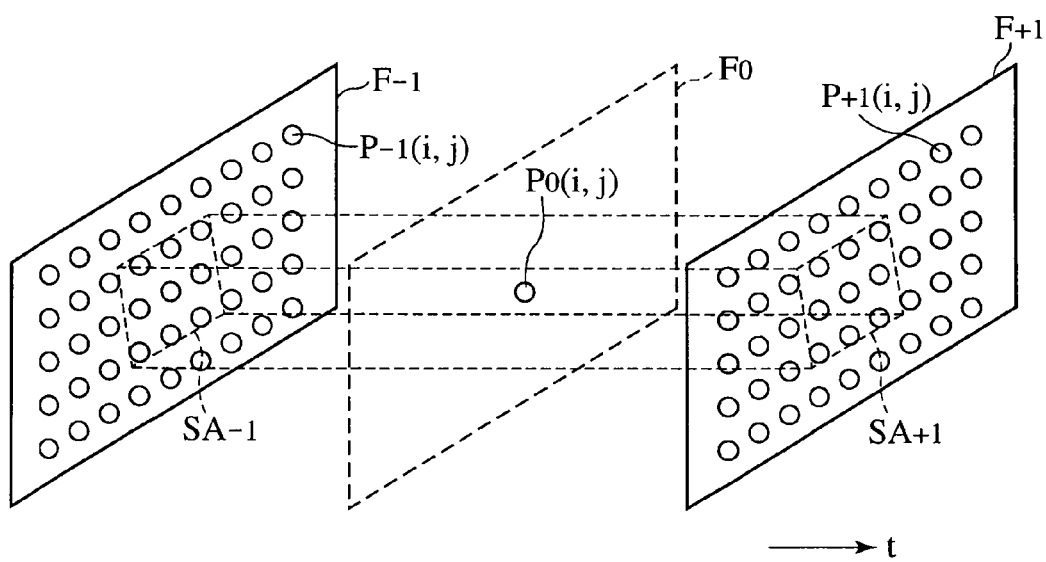
FIG. 2 is a diagram representing the relationship between an immediately previous frame, a current frame, and an interpolation frame.

FIG. 2 is a diagram representing a relationship between the immediately previous frame $F_{-1}$, the current frame $F_{+1}$, and the interpolation frame $F_0$.

In the figure, the number of pixels in horizontal and vertical directions of the interpolation frame $F_0$ is equal to the total number of pixels in the frames input (i.e., the current frame $F_{+1}$ and the immediately previous frame $F_{-1}$: hereinafter, these frames are referred to as input frames with respect to the interpolation frame). For XGA, for instance, the number of pixels in the horizontal direction is 1280 and that of pixels in the vertical direction is 768 (a pixel pattern of nine horizontal pixels by five vertical pixels, however, is shown in FIG. 2). Pixels facing one another, therefore, exist between the frames $F_{+1}, F_{-1}, F_0$.

Suppose now that a position in the interpolation frame $F_0$ where an interpolation pixel is to be interpolated, that is, the interpolation position, is taken as $P_0$ (i, j), and that the pixel position in the immediately previous frame $F_{-1}$ that faces the interpolation position $P_0$ (i, j) is $P_{-1}$ (i, j). Hereinafter, pixels whose positions match each other when respective frames are exactly fit together are referred to as facing pixels. Also, suppose that the pixel position in the current frame $F_{+1}$ that faces the interpolation position $P_0$ (i, j) is $P_{+1}$ (i, j). In this example, both "i" and "j" take an integer of 0, 1, 2, etc. In addition, assume that a search area $SA_{-1}$ having an K number of horizontal pixels and an L number of vertical pixels, with a pixel of the pixel position $P_{-1}$ (i, j) as a central pixel, is set in the immediately previous frame $F_{-1}$ (in this example, both K and L are an odd number of 3 or more). Furthermore, assume that a search area $SA_{+1}$ having an K number of horizontal pixels and an L number of vertical pixels, with the pixel of the pixel position $P_{-1}$ (i, j) as the central pixel, is set in the current frame $F_{+1}$. Moreover, assume that a pixel of a pixel position $P_{-1}$ (i+m, j+n) in the search area $SA_{-1}$ of the immediately previous frame $F_{-1}$, and that pixel of a pixel position $P_{+1}$ (i-m, j-n) in the search area $SA_{+1}$ of the current frame $F_{+1}$ which faces the pixel of the pixel position $P_{-1}$ (i+m, j+n) via the interpolation position $P_0$ (i, j) in the interpolation frame $F_0$ constitute a pair. Hereinafter, the two pixels are referred to collectively as the pixel pair.

Figure 3:
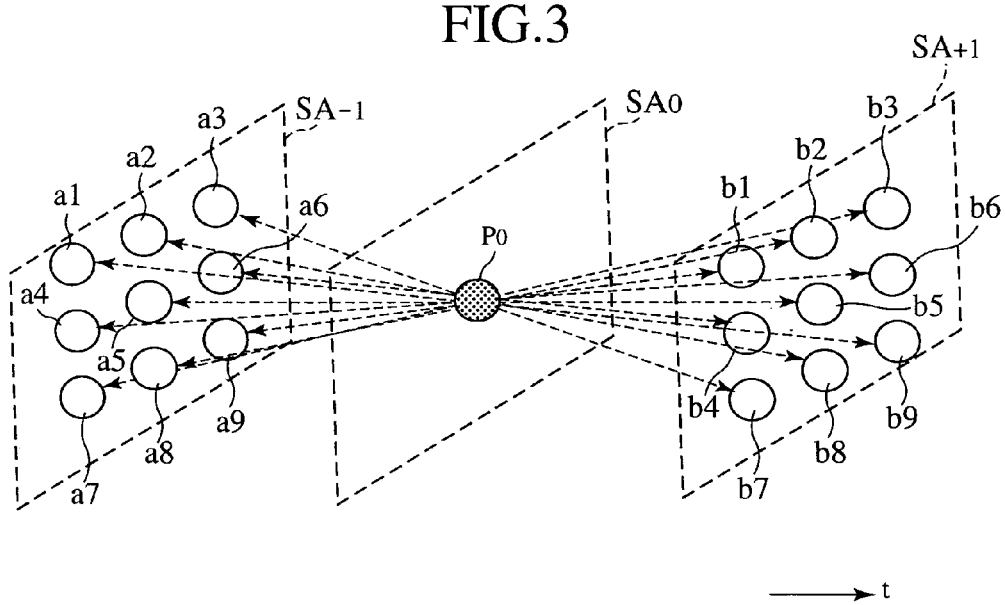
FIG. 3 is a diagram showing in enlarged form a search area in the immediately previous frame of FIG. 2, a search area in the current frame of FIG. 2, and an area in the interpolation frame opposed to the two frames.

FIG. 3 is a diagram showing in enlarged form the search area $SA_{-1}$ in the immediately previous frame $F_{-1}$ of FIG. 2, the search area $SA_{+1}$ in the current frame $F_{+1}$ of FIG. 2, and an area $SA_0$ assigned to the interpolation frame $F_0$ opposed to the two frames.

In FIG. 3, the search areas $SA_{-1}$ and $SA_{+1}$ are each set as an area having a pixel format of 3 horizontal pixels×3 vertical pixels, and the pixel at the $P_{-1}$ (i, J) in the search area $SA_{-1}$ is moved horizontally from an upper left corner thereof to a lower right corner in order, whereby the pixels generated at respective positions are taken as a1, a2, a3, etc. up to a9.

Similarly, the pixel at the $P_{+1}$ (i, j) in the search area $SA_{+1}$ is moved from an upper left corner thereof to a lower right corner in order, whereby the pixels generated at respective positions are taken as b1, b2, b3, etc. up to b9. Therefore, the search area $SA_{-1}$ is set with the pixel a6 at its central position, and the search area $SA_{+1}$ is set with the pixel b6 at its central position. The interpolation position $P_0$ (i, j) in the area $SA_0$ of the interpolation frame $F_0$ faces the central pixel b6 of the search area $SA_{+1}$ and the central pixel a6 of the search area $SA_{-1}$. An interpolation pixel present at the interpolation position $P_0$ (i, j) is taken as c6.

In such search areas $SA_{-1}$ and $SA_{+1}$, the pixel a1 in the search area $SA_{-1}$ faces the pixel b9 of the search area $SA_{+1}$ via the pixel c6 of the area $SA_0$ in the interpolation frame $F_0$ (i.e., the pixels a1 and b9 have a point-symmetrical positional relationship with respect to the interpolation pixel c6). A combination of any two pixels having such a relationship is referred to as a pixel pair. In the example of FIG. 3, therefore, nine pixel pairs are present:

Pixels a1-b9, pixels a2-b8, pixels a3-b7
pixels a4-b6, pixels a5-b5, pixels a6-b4,
pixels a7-b3, pixels a8-b2, pixels a9-b1.

For each pixel pair, the minimum differential pair calculator 4 in FIG. 1 first calculates differential luminance values of the pixels constituting a particular pixel pair, and defines a pixel pair whose absolute differential luminance value becomes a minimum. That is to say, if the luminance values of the pixels a1, a2, etc. up to a9 are expressed as a1, a2, etc. up to a9, respectively, and the luminance values of the pixels b1, b2, etc. up to b9 are expressed as b1, b2, etc. up to b9, respectively, absolute differential luminance values ΔY (k) (where k=1, 2, . . . , 9) of the above pixel pairs are given as follows:

$\Delta Y(1)=|a1-b9|, \Delta Y(2)=|a2-b8|$
$\Delta Y(3)=|a3-b7|, \Delta Y(4)=|a4-b6|$
$\Delta Y(5)=|a5-b5|, \Delta Y(6)=|a6-b4|$
$\Delta Y(7)=|a7-b3|, \Delta Y(8)=|a8-b2|$
$\Delta Y(9)=|a9-b1|$ (where |A| denotes an absolute value, which also applies throughout the rest of this document).

The pixel pair whose absolute differential luminance value ΔY(k) becomes a minimum is determined and this pixel pair is defined as a pixel pair of minimum difference.

When the pixel pair of minimum difference is thus obtained, position information on each pixel constituting the pixel pair of minimum difference is output as interpolation pixel vectors to the interpolation frame generator 5.

With reference back to FIG. 1, the interpolation frame generator 5 uses the interpolation pixel vectors from the minimum differential pair calculator 4 to process the current frame $F_{+1}$ that was delay-controlled by the delay controller 3, and the immediately previous frame $F_{+1}$, and thus generate the interpolation frame $F_0$. The delay controller 3 delays the current frame $F_{+1}$ and the immediately previous frame $F_{+1}$ according to a particular delay in processing by the minimum differential pair calculator 4, and matches the two frames to the interpolation pixel vectors in terms of timing.

The interpolation pixel vectors here indicate that in a next current frame $F_{+1}$, the pixel in the immediately previous frame $F_{-1}$ that is one constituent element of the pixel pair of minimum difference has moved to the position of the pixel in the current frame $F_{+1}$ that is the other constituent element of the pixel pair of minimum difference. Moving directions of these interpolation pixel vectors pass through the interpolation position $P_0$ (i, j) in the interpolation frame $F_0$. In FIG. 3, for example, if the pair formed up of the pixel a2 in the immediately previous frame $F_{-1}$ and the pixel b8 in the current frame $F_{+1}$ is detected as the pixel pair of minimum difference, this indicates that with respect to the interpolation position $P_0$ (i, j) in the interpolation frame $F_0$, the pixel a2 in the immediately previous frame $F_{-1}$ has become the pixel b8 in the current frame $F_{+1}$. This, in turn, means that a movement of a pixel from position a2 to position b8 has occurred between the frames $F_{-1}$, $F_{+1}$. This moving direction goes through the interpolation position $P_0$ (i, j) in the interpolation frame $F_0$.

At the interpolation frame generator 5, therefore, among all pixels of the immediately previous frame $F_{-1}$ from the delay controller 3, only one of the two pixels forming the particular pixel pair of minimum difference is extracted from the immediately previous frame $F_{-1}$ on the basis of the interpolation pixel vectors. Likewise, among all pixels of the current frame $F_{+1}$ from the delay controller 3, only the other pixel forming the particular pixel pair of minimum difference is extracted from the current frame $F_{+1}$ on the basis of the interpolation pixel vectors. The average luminance value and chroma value of these extracted pixels are calculated and these values are defined as a luminance value and chroma value of the interpolation pixel at the interpolation position $P_0$ (i, j) in the interpolation frame $F_0$. The values (luminance value and chroma value) of the interpolation pixel are not always defined as the above average values. For example, the values obtained by conducting a specific desired weighting addition on each of the above values of the pixels which were extracted from the immediately previous frame $F_{-1}$ and the current frame $F_{+1}$ may be adopted as the values of the interpolation pixel, or the pixel values in either the immediately previous frame $F_{-1}$ or the current frame $F_{+1}$ may be taken as the interpolation pixel values. Otherwise, the interpolation pixel may be generated using any other method.

When the current frame $F_{+1}$ is input from the input terminal 1 in this way, an interpolation pixel vector is generated for each of the pixels of the current frame $F_{+1}$ by the minimum differential pair calculator 4. This interpolation pixel vector is then used by the interpolation frame generator 5 to generate interpolation pixels from the immediately previous frame $F_{-1}$ and current frame $F_{+1}$ supplied from the delay controller 3, and the interpolation frame $F_0$ is generated.

The interpolation frame generator also calculates the chroma value of the interpolation pixel $P_0$ (i, j) on the basis of the interpolation pixel vector previously calculated above from the chroma value. The chroma value of the interpolation pixel $P_0$ (i, j), however, is not always calculated in this manner. For example, if the input signal is a chroma signal formed up of red (R), green (G), and blue (B), matrix conversions into a luminance signal Y and color difference signals Cb, Cr may be conducted and interpolation pixel vectors calculated for each of the signals. Alternatively, the interpolation pixel vectors may be calculated for each of the R-, G-, and B-signals, and thus a luminance value and color difference value of the interpolation pixel may be calculated.

In addition, the interpolation pixel vector may be calculated using the luminance value, and the interpolation frame may be generated from the R-, G-, and B-signals.

Furthermore, the interpolation pixel vector may be calculated for each luminance value and chroma value, and these interpolation pixel vectors, if both oriented in the same direction, may be regarded as reliable enough to be adopted. If the calculated interpolation pixel vectors are oriented in completely different directions, these vectors may be regarded as too low in reliability to be employed. In this latter case, an interpolation frame may be generated using any other suitable method, for example, linear interpolation.

As described above, in the present embodiment, it is possible to create a highly accurate interpolation frame on a small circuit scale, and thus to conduct a more accurate frame rate conversion.

Figure 4:
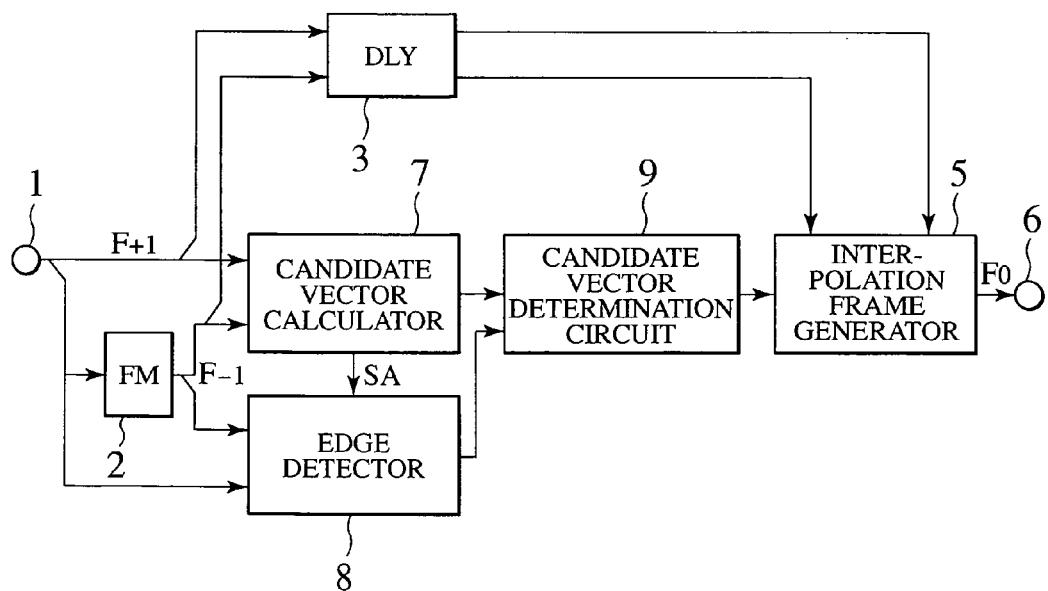
FIG. 4 is a block diagram showing a second embodiment of an image interpolation device according to the present invention.

FIG. 4 is a block diagram showing a second embodiment of an image interpolation device according to the present invention. Reference numeral 7 in FIG. 4 denotes a candidate interpolation pixel vector calculator, 8 an edge detector, and 9 an interpolation pixel vector determination circuit. Also, a section equivalent to that of FIG. 1 is assigned the same reference numeral in order to omit description.

For the first embodiment shown in FIG. 1, pixel pairs are calculated by the minimum differential pair calculator 4, then one specific pixel pair whose absolute differential luminance value becomes a minimum is selected from the pixel pairs, and an interpolation pixel vector is generated. In the second embodiment, however, a plurality of pixel pairs are selected from calculated pixel pairs in normal ascending order of an absolute differential luminance value, then a specific pixel pair is further selected from the above-selected plurality of pixel pairs in accordance with edge information, and an interpolation pixel vector is generated.

As with the minimum differential pair calculator 4 in FIG. 1, the candidate interpolation pixel vector calculator 7 in FIG. 4 defines pixel pairs in such search areas as illustrated in FIG. 3, and calculates absolute differential luminance values of respective pixels. Next after selecting as candidate pixel pairs an X number of pixel pairs (e.g., 10 pairs) in ascending order of the absolute differential luminance value, the candidate interpolation pixel vector calculator 7 calculates candidate pixel vectors of each candidate interpolation pixel pair and supplies calculation results as candidate interpolation pixel vectors to the interpolation pixel vector determination circuit 9.

An immediately previous frame $F_{-1}$ and a current frame $F_{+1}$ are further supplied from a frame memory 2 and an input terminal 1, respectively, to the edge detector 8, and search areas SA are further supplied from the candidate interpolation pixel vector calculator 7 to the edge detector 8. On the basis of these frames and search areas, presence/absence and directions of horizontal edges in each search area SA are detected and detection results are supplied as edge information to the interpolation pixel vector determination circuit 9.

Of all candidate interpolation pixel vectors supplied from the candidate interpolation pixel vector calculator 7, only the candidate interpolation pixel vectors satisfying the later-described edge conditions based on the edge information from the edge detector 8 are selected by the interpolation pixel vector determination circuit 9. The thus-selected candidate interpolation pixel vectors are supplied as candidate pixel vectors to an interpolation frame generator 5. When a plurality of candidate interpolation pixel vectors satisfying the edge conditions are present, only the candidate interpolation pixel vector of the candidate pixel pair formed up of pixels closer to a particular interpolation position is selected by the interpolation pixel vector determination circuit 9.

The interpolation frame generator 5, as with the interpolation frame generator 5 in FIG. 1, generates an interpolation frame $F_0$ from the interpolation pixel vector that has been selected by the interpolation pixel vector determination circuit 9, by using the immediately previous frame $F_{-1}$ and current frame $F_{+1}$ transferred from a delay controller 3.

The edge conditions used in the interpolation pixel vector determination circuit 9 are described below.

Figure 5:
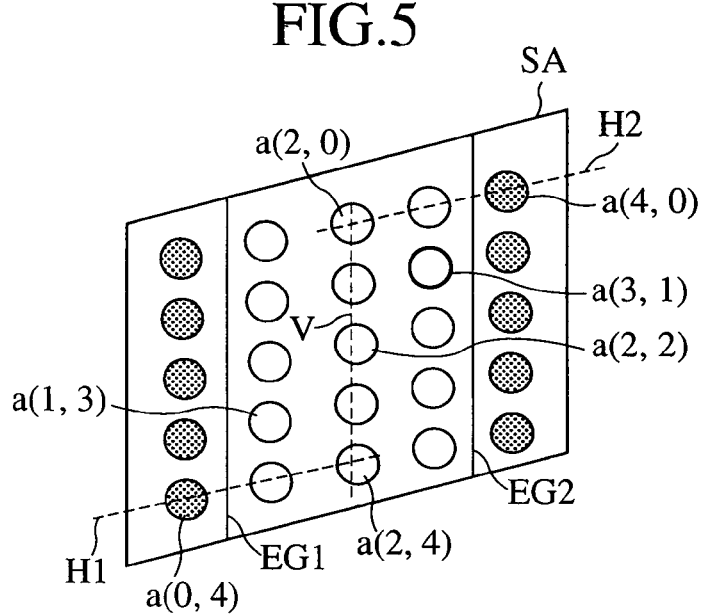
FIG. 5 is a diagram illustrating the edge conditions used for the candidate interpolation pixel vector determination circuit shown in FIG. 4.

FIG. 5 is a diagram showing a specific example of a method of detecting the presence/absence of edges with respect to the pixels constituting the pixel pair of minimum difference of the candidate interpolation pixel vector. A search area $SA_{-1}$ in the immediately previous frame $F_{-1}$ or a search area $SA_{+1}$ in the current frame $F_{+1}$ is shown as a search area SA in FIG. 5.

Assume that in FIG. 5, the search area SA has a pixel pattern of five horizontal pixels by five vertical pixels. Also, assume that as a result of a detection process in the search area SA by the edge detector 8, a horizontal edge EG1 exists between the first and second pixel rows from left in a horizontal direction of FIG. 5, and that a horizontal edge EG2 exists between the fourth and fifth pixel rows in the horizontal direction. Additionally, assume that an area between the horizontal edges EG1 and EG2 is of a high luminance level and that both sides of this high-luminance area are of a low luminance level. A pixel "a (2, 2)" is present as a central pixel of the search area SA.

If a pixel "a (0, 4)" at the lowest position of the first pixel row from the left in the horizontal direction is one counterpart of a candidate pixel pair and this pixel is taken as a subject of judgment, a judgment of whether an edge is present near the subject of judgment, that is, the pixel "a (0, 4)", is conducted as one of the edge conditions. During this judgment, a pixel "a (2, 4)" at an intersection between a horizontal line H1 passing through the subject of judgment, that is, the pixel "a (0, 4)", and a vertical line V passing through the central pixel "a (2, 2)" of the search area SA, is detected and then the presence/absence of an edge is judged in an area from the pixel "a (0, 4)" to the pixel "a (2, 4)" (hereinafter, this area up to the interpolation position is referred to as the horizontal area). This judgment can be conducted from pixel positions within the horizontal area ranging from the pixel "a (0, 4)" to the pixel "a (2, 4)", and from the edge information supplied from the edge detector 8. For the subject of judgment, that is, the pixel "a (0, 4)", "Edge present" is obtained as judgment results since the horizontal edge EG1 exists between this pixel and the pixel located next to the right thereof. Similarly, if a pixel "a (4, 0)" at the highest position of the fifth pixel row from the left in the horizontal direction is one counterpart of a candidate pixel pair and this pixel is taken as a subject of judgment, a judgment of whether an edge is present near the subject of judgment, that is, the pixel "a (4, 0)", is conducted. During this judgment, a pixel "a (2, 0)" at an intersection between a horizontal line H2 passing through the subject of judgment, that is, the pixel "a (4, 0)", and the vertical line V passing through the central pixel "a (2, 2)" of the search area SA, is detected and then the presence/absence of an edge is judged in the horizontal area up to the interpolation position, ranging from the pixel "a (4, 0)" to the pixel "a (2, 0)". For the subject of judgment, that is, the pixel "a (4, 0)", "Edge present" is obtained as judgment results since the horizontal edge EG2 exists between this pixel and the pixel located next to the left thereof.

Additionally, if the second pixel "a (1, 3)" from the bottom of the second pixel row from the left in the horizontal direction is one counterpart of a candidate pixel pair and this pixel is taken as a subject of judgment, when processing similar to the above is executed, "Edge absent" is obtained as judgment results for the subject of judgment, that is, the pixel "a (1, 3)", since a horizontal edge does not exist in the area up to the interpolation position. Similarly, if the second pixel "a (3, 1)" from the top of the fourth pixel row from the left in the horizontal direction is one counterpart of a candidate pixel pair and this pixel is taken as a subject of judgment, "Edge absent" is obtained as judgment results for the subject of judgment, that is, the pixel "a (3, 1)", since a horizontal edge does not exist in the area up to the interpolation position.

In this way, the judgment of whether an edge exists is conducted as an edge detection criterion, for each pixel of the candidate pixel pairs in the search area $SA_{-1}$ of the immediately previous frame $F_{-1}$ and in the search area $SA_{+1}$ of the current frame $F_{+1}$.

Figure 6:
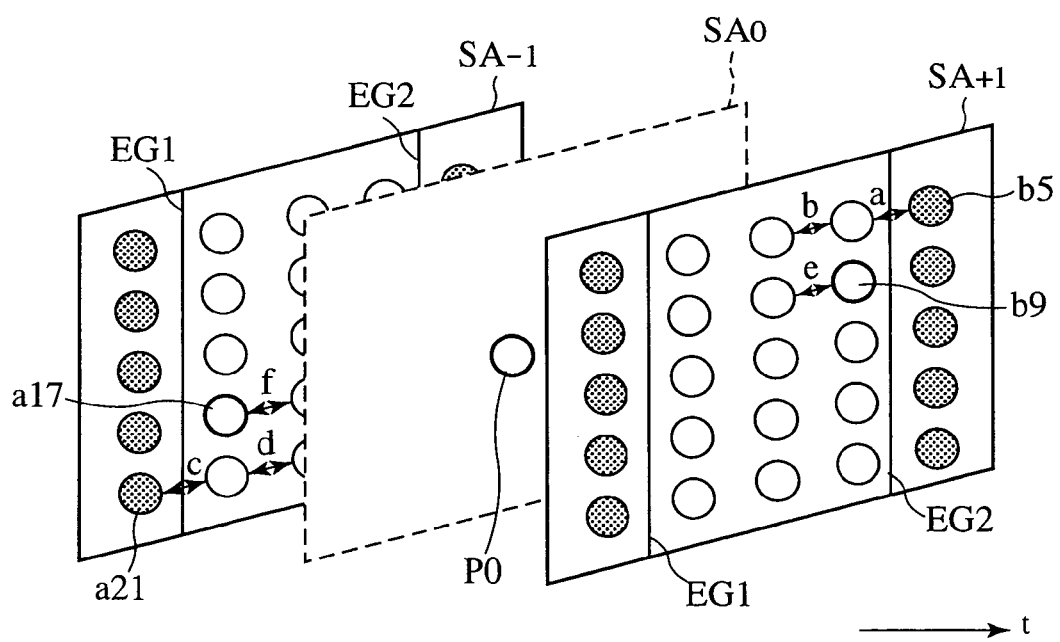
FIG. 6 is a diagram showing a specific example of the judging method used for the candidate interpolation pixel vector determination circuit in FIG. 4.

FIG. 6 is a diagram showing a specific example of a candidate pixel pair selection method which uses the above edge detection results.

In FIG. 6, pixels a21, a17 in the search area $SA_{-1}$ of the immediately previous frame $F_{-1}$ are equivalent to the pixels "a (0, 4)", "a (1, 3)", respectively, in FIG. 5, and pixels b5, b9 in the search area $SA_{+1}$ of the current frame $F_{+1}$ are equivalent to the pixels "a (4, 0)", "a (3, 1)", respectively, in FIG. 5. FIG. 6 also assumes that horizontal edges EG1, EG2 exist at the positions in the search areas $SA_{-1}$, $SA_{+1}$, that are associated with those of the search area SA in FIG. 5.

In this example, the pixel a21 in the search area SA 1 and the pixel b5 in the search area $SA_{+1}$ have a point-symmetrical positional relationship with respect to interpolation position $P_0$ in an interpolation frame $F_0$, and form a selected candidate pixel pair. For this candidate pixel pair [a21∥b5], when the above Judging process is conducted, the presence/absence of a horizontal edge is Judged in a pixel section "c" between one subject of Judgment, that is, the pixel a21, and the pixel located next to the right thereof, and in a pixel section "d" between the pixel located next to the right of a21 and the pixel located next further to the right of that pixel. Since a horizontal edge EG1 exists in the pixel section "c", "Edge present" is obtained as Judgment results for the pixel a21. The presence/absence of a horizontal edge is Judged in a pixel section "a" between another subject of Judgment, that is, the pixel b5, and the pixel located next to the left thereof, and in a pixel section "b" between the pixel located next to the left of b5 and the pixel located next further to the left of that pixel. Since a horizontal edge EG2 exists in the pixel section "a", "Edge present" is obtained as Judgment results for the pixel b5. When "Edge present" is obtained as the Judgment results for both the pixels a21 and b5 of the candidate pixel pair [a21∥b5] in this way, an associated candidate interpolation pixel vector is not selected since this vector is judged not to be reliable enough for adoption.

The pixel a17 in the search area $SA_{-1}$ and the pixel b9 in the search area $SA_{+1}$ also have a point-symmetrical positional relationship with respect to the interpolation position $P_0$ in the interpolation frame $F_0$, and form another selected candidate pixel pair. For this candidate pixel pair [a17∥b9], when the above judging process is conducted, the presence/absence of a horizontal edge is judged in both pixel sections "f" and "e". In this example, "Edge absent" is obtained as judgment results for both pixels a17, b9. For a candidate pixel pair without an edge, a candidate interpolation pixel vector of this pixel pair is selected since the vector is judged to be reliable enough for adoption.

In this manner, if "Edge present" is obtained as the judgment results for both pixels in the candidate pixel pair, the candidate interpolation pixel vector of this pixel pair is not selected by the candidate interpolation pixel vector determination circuit 9.

The reason for this is as follows:

As in the first embodiment of FIG. 1, when a pixel pair whose absolute differential luminance value becomes a minimum is selected as a pixel pair of minimum difference from the pixel pairs detected, since the pixels a21, b5 in the candidate pixel pair [a21∥b5] exist in a low-level area, an absolute differential luminance value of this candidate pixel pair may be smaller than that of the candidate pixel pair [a17∥b9]. If this is the case, the candidate pixel pair [a21∥b5] will be selected and its candidate pixel vector will be supplied to an interpolation frame generator 5. As a result, this candidate pixel vector will be used to generate the interpolation frame $F_O$.

In such a case, the candidate pixel pair [a21∥b5] may have been selected partly because both pixels a21, b5 exist in a low-level area. Therefore, interpolation pixels in a high-level area are usually mis-generated from the candidate pixel pair [a21∥b5]. If interpolation pixels are actually generated from such an erroneously selected pixel pair, deterioration of image quality could arise from motion judder.

In the second embodiment, as described above, a plurality of candidate interpolation pixel vectors are selected using the edge conditions. This means that candidate interpolation pixel vectors not satisfying the edge conditions, such as the vectors mentioned above, are excluded and thus that the deterioration of image quality, coupled with frame interpolation, can be prevented.

The above specific examples apply when "Edge present" is obtained as Judgment results for both pixels of a candidate pixel pair. In this case, even when "Edge present" is obtained, that is, even when horizontal edges exist between the pixels in the horizontal area from the pixel as the subject of the Judgment to the interpolation position, it is confirmed whether an edge exists for one pixel (i.e., a horizontal edge has been detected only in one pixel section of the candidate pixel pair) or any horizontal edges detected between plural pixels are all oriented in the same direction. The candidate interpolation pixel vectors of the candidate pixel pairs satisfying the particular edge condition are thus selected. A direction in which the luminance value lowers is referred to as a direction of the edge.

For example, two horizontal edges are detected between the two pixels in the candidate pixel pair [a21∥b5] of FIG. 6. That is, a horizontal edge EG1 exists in the pixel section "c" for the pixel a21, and a horizontal edge EG2 exists in the pixel section "a" for the pixel b5. Since the edge in the pixel section "c" is leftward and the edge in the pixel section "a" Is rightward, the two edges for the candidate pixel pair [a21∥b5] differ in direction from each other. This means that the candidate pixel pair [a21∥b5] does not satisfy the edge condition and thus that the candidate interpolation pixel vector of this candidate pixel pair is not selected by the candidate interpolation pixel vector determination circuit 9.

Figure 7:
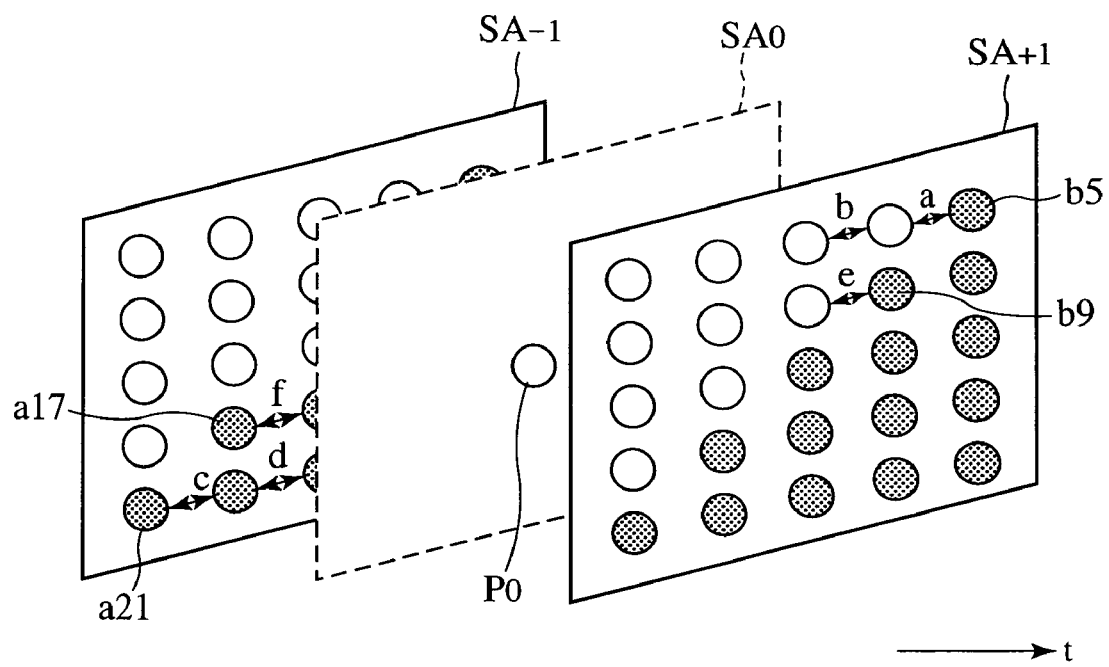
FIG. 7 is a diagram showing another specific example of the judgment processing method used for the candidate interpolation pixel vector determination circuit in FIG. 4.

Also, suppose that for example, an edge oriented in a rightward rising direction is present between the search area $SA_{-1}$ of the immediately previous frame $F_{-1}$ and the search area $SA_{+1}$ of the current frame $F_{+1}$, as shown in FIG. 7, and that the pixel a21 in the search area $SA_{-1}$ and the pixel b5 in the search area $SA_{+1}$ are selected as the candidate pixel pair [a21∥b5] by the candidate interpolation pixel vector calculator 7. For the pixel b5, the presence/absence of a horizontal edge is detected between the pixel sections "a", "b" in the horizontal area up to the interpolation position, and for the pixel a21, the presence/absence of a horizontal edge is also detected between the pixel sections "c", "d" in the horizontal area up to the interpolation position. In this case, the candidate interpolation pixel vector of the candidate pixel pair [a21∥b5] is selected since a horizontal edge exists only in the pixel section "a" and does not exist anywhere else. For the candidate pixel pair [a17∥b9] constituted by the pixel a17 in the search area $SA_{-1}$ and the pixel b9 in the search area $SA_{-1}$, the presence/absence of a horizontal edge is also detected in the respective pixel sections "f", "e". In this case, the candidate interpolation pixel vector of the candidate pixel pair [a17∥b9] is selected since a horizontal edge exists only in the pixel section "e" and does not exist anywhere else.

That is to say, if, in FIG. 7, the pixels a21 and b5 form a candidate pixel pair and the pixels a17 and b9 form another candidate pixel pair, the candidate interpolation pixel vectors of the candidate pixel pairs [a21∥b5], [a17∥b9] are selected on the basis of the above edge judgments since both vectors are regarded as satisfying the edge conditions.

However, a plurality of candidate Interpolation pixel vectors satisfying the edge conditions may be thus detected. This means that those pixels of the candidate pixel pairs which are closer to the interpolation position $P_0$ are selected. Therefore, those candidate interpolation pixel vectors of the candidate pixel pairs which are closer to the central pixels In the respective search areas $SA_{-1}$, $SA_{+1}$ are selected. In the above case, the interpolation frame generator 9 (see FIG. 4) selects the candidate interpolation pixel vector of the candidate pixel pair [a17∥b9] as the interpolation pixel vector for generating an interpolation frame.

For example, if either the edge EG1 or EG2 is not present in FIG. 6, since a horizontal edge Is present only in one pixel section of the candidate pixel pair [a21∥b5], this pixel pair is unlikely to be selected as a candidate pixel pair by the candidate interpolation pixel vector calculator 7. This is because, although the edge is present only in one pixel section, when one pixel forming the pixel pair exists on one side (e.g., in the high-level area) of one edge and the other pixel exists on the other side (e.g., in the low-level area) of the edge, these pixels are usually large in absolute differential luminance value.

Figure 8:
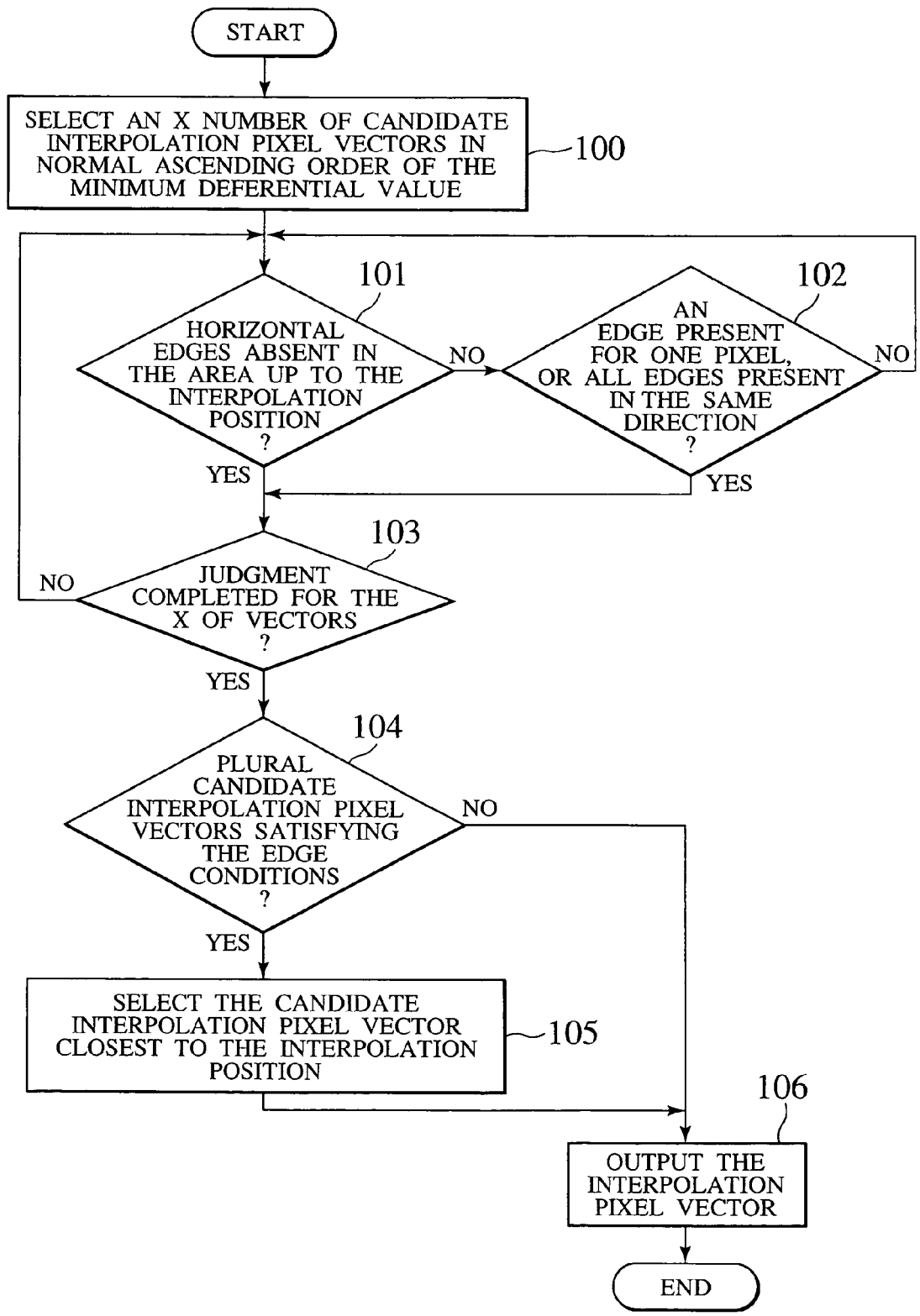
FIG. 8 is a flowchart that shows processing operation of the candidate interpolation pixel vector determination circuit in FIG. 4.

FIG. 8 is a flowchart illustrating the above-described interpolation pixel vector selection sequence of the candidate interpolation pixel vector determination circuit 9 in FIG. 4.

In step 100 of FIG. 8, the vectors of the candidate interpolation pixels in the X number of candidate pixel pairs selected by the candidate interpolation pixel vector calculator 7 are acquired in normal ascending order of the above absolute differential value. Based on the edge information that the edge detector 8 has detected, judgments for agreement with the edge conditions are conducted for each candidate interpolation pixel vector. During the judgments, candidate interpolation pixel vectors not having a horizontal edge in the horizontal area up to the interpolation position are regarded as satisfying the edge conditions, in step 101. Even if a horizontal edge is detected in the horizontal area up to the interpolation position, when the edge in this area exists in one pixel section (i.e., one edge exists for one pixel), or even if horizontal edges are detected between a plurality of pixels, when these horizontal edges are all in the same direction, the associated candidate interpolation pixel vectors are also regarded as satisfying the edge conditions, in step 102.

When the judgments of the X number of candidate interpolation pixel vectors for agreement with the edge conditions are completed in step 103, if, in step 104, one candidate interpolation pixel vector only is consequently regarded and selected as satisfying the edge conditions, this selected candidate interpolation pixel vector is supplied as the interpolation pixel vector to the interpolation frame generator 5, and used in step 106 to generate the interpolation frame $F_O$. If, in step 104, a plurality of candidate interpolation pixel vectors are selected as the vectors satisfying the edge conditions, then among all these candidate interpolation pixel vectors, only the candidate interpolation pixel vector of the candidate pixel pair closest to the interpolation position in the interpolation frame $F_O$ is selected in step 105. That is, of all pixels in the candidate pixel pairs, only the candidate interpolation pixel vector of the candidate pixel pair closest to the central pixel in the search area $SA_{-1}$ of the immediately previous frame $F_{-1}$ or to the central pixel in the search area $SA_{-1}$ of the current frame $F_{+1}$ is selected in step 105. The thus-selected candidate interpolation pixel vector is supplied in step 106 to the interpolation frame generator 5 as the interpolation pixel vector for generating the interpolation frame.

As described above, in the second embodiment, it becomes possible, by adding an edge condition as one condition for selecting from a plurality of candidate interpolation pixel vectors the interpolation pixel vector for generating the interpolation frame $F_0$, to create a more accurate interpolation frame and hence to conduct a more accurate frame rate conversion.

Figures 9, 10:
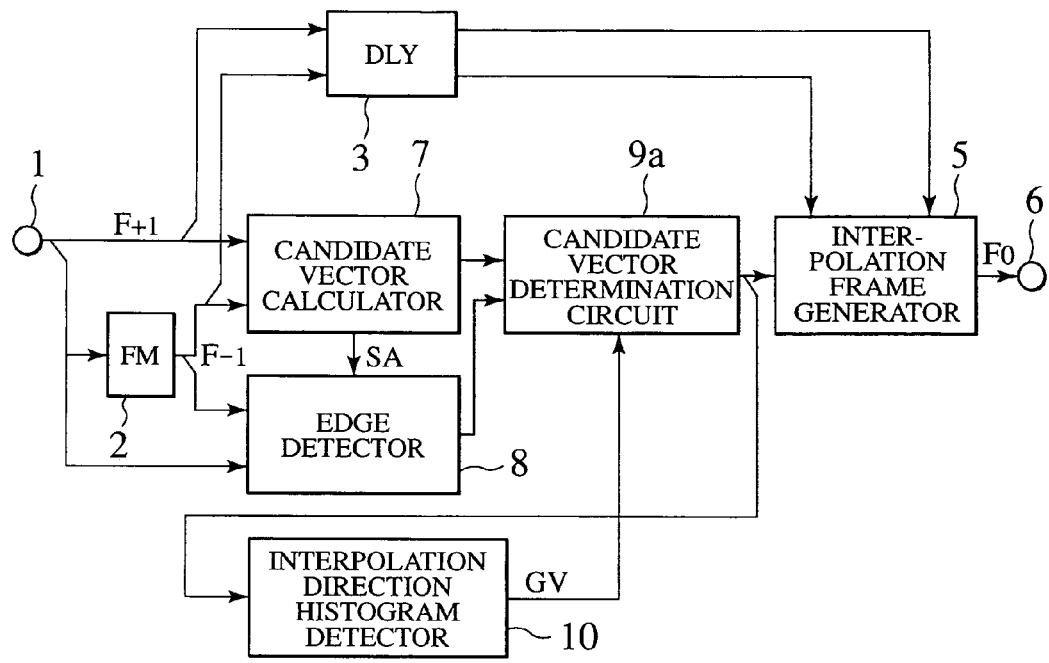
FIG. 9 is a block diagram showing a third embodiment of an image interpolation device according to the present invention.
FIG. 10 is a diagram schematically showing a histogram generated by the interpolation direction histogram detector shown in FIG. 9.

FIG. 9 is a block diagram showing a third embodiment of an image interpolation device according to the present invention. Reference numeral 9a in FIG. 9 denotes a candidate interpolation pixel vector determination circuit, and 10 an interpolation direction histogram detector. Sections equivalent to those of FIG. 4 are each assigned the same reference numeral, and description of these sections is omitted to avoid duplicate description.

In the present third embodiment, an interpolation pixel vector to be used to generate an interpolation frame is selected by an interpolation frame generator 5 considering, in addition to other factors, a direction of moving an entire image screen by, for example, scrolling at a constant rate.

In the candidate interpolation pixel vector determination circuit 9a of FIG. 9, as in the second embodiment of FIG. 4, of all the X number of candidate interpolation pixel vectors selected by a candidate interpolation pixel vector calculator 7, only the interpolation pixel vector for generating the interpolation frame is selected by an interpolation frame generator 5 using, in addition to edge conditions based on edge information from an edge detector 8, an approximate moving direction (hereinafter, referred to as global vector GV) of the entire image screen detected by the interpolation direction histogram detector 10. The global vector GV is generated from the interpolation pixel vectors selected by the candidate interpolation pixel vector determination circuit 9a, for each interpolation pixel in the interpolation frame last generated.

More specifically, each time an interpolation pixel vector is output from the candidate interpolation pixel vector determination circuit 9a, the interpolation direction histogram detector 10 acquires the interpolation pixel vector, then after discriminating the direction indicated by the acquired interpolation pixel vector and counting the number of appearances of interpolation pixel vectors for each classification of respective directions, and creates a histogram of direction-classified interpolation pixel vectors of all interpolation pixels in that interpolation frame. After this, a dominant direction is detected from the histogram and the detected direction is defined as the global vector GV.

FIG. 10 schematically shows an example of a histogram and is a representation of directions as interpolation pixel vectors.

That is, the interpolation pixel vectors selected by the candidate interpolation pixel vector determination circuit 9a represent position information of candidate pixel pairs present in the search areas $SA_{-1}$, $SA_{+1}$ that are set at that time. The interpolation pixel vectors therefore signify the moving directions of the images existing in the search areas $SA_{-1}$, $SA_{+1}$. The moving direction of an image in one of the search areas $SA_{-1}$, $SA_{-1}$, therefore, can be identified by specifying pixel positions in either the search area $SA_{-1}$ or $SA_{-1}$ of the associated pixel pair.

FIG. 10 represents the moving direction of the image in one search area by the positions of the pixels in an immediately previous frame $F_{-1}$ in this way. In this figure, the search area has a pixel pattern of 11 horizontal pixels by 5 vertical pixels, in which case, each pixel is expressed as P (i, j), where "i"=0, 1, 2, etc. up to 10 and "j"=0, 1, 2, 3, 4. A central pixel in this search area is expressed as a pixel P (5, 2).

For example, a pixel P (0, 0) is paired with a pixel (10, 4) in the search area $SA_{+1}$ of a current frame $F_{+1}$. If this pixel pair is the pixel pair of the interpolation pixel vector which has been selected by the candidate interpolation pixel vector determination circuit 9a, the image in the search area at that time will move from the pixel P (0, 0) within the search area $SA_{-1}$ of the immediately previous frame to the pixel (10, 4) within the search area $SA_{+1}$ of the current frame $F_{+1}$.

Therefore, the interpolation pixel vectors output from the candidate interpolation pixel vector determination circuit 9a are counted for each of their pixel pairs, whereby a histogram of interpolation pixel vectors associated with the generated interpolation frame $F_0$ is obtained as in FIG. 10, for example.

In this histogram, a pixel (5, 3) with an appearance count of "56872" is the pixel having the highest interpolation pixel vector appearance count. Accordingly, the images in all search areas that were set for generating the particular interpolation frame move from the pixel P (5, 3) within the immediately previous frame $F_{-1}$ to the pixel (5, 1) of the current frame $F_{+1}$ that is present at a position point-symmetrical to the central pixel P (5, 2). This direction is recognized as the moving direction of the entire image existing when control is transferred from the immediately previous frame $F_{-1}$ to the current frame $F_{+1}$, that is, the direction is defined as the global vector GV. A position of the central pixel (5, 2) in this case, is referred to as an interpolation position $P_0$, and a position of the pixel (5, 3) that defines the global vector GV is referred to as a position of the global vector GV.

When the interpolation frame $F_0$ is thus generated by the interpolation frame generator 5, the interpolation direction histogram detector 10 generates the global vector GV and supplies the global vector to the candidate interpolation pixel vector determination circuit 9a. The candidate interpolation pixel vector determination circuit 9a then uses the global vector GV together with the edge information from the edge detector 8 in order to select the interpolation pixel vector needed to generate a next interpolation frame $F_0$.

Of all the X number of candidate interpolation pixel vectors whose absolute differential values have been calculated by the candidate interpolation pixel vector calculator 7 for each interpolation position in the next interpolation frame to be generated, only the candidate interpolation pixel vector satisfying the above-mentioned edge conditions and matching the global vector GV in terms of direction is selected as the interpolation pixel vector by the candidate interpolation pixel vector determination circuit 9a. The thus-selected interpolation pixel vector is supplied to the interpolation frame generator 5. This interpolation pixel vector is also supplied to the interpolation direction histogram detector 10 in order to create a global vector GV for generating a further next interpolation frame.

If direction grouping on a global vector basis is provided beforehand, even when the directions of candidate interpolation pixel vectors do not completely match the global vector GV, the directions of the candidate interpolation pixel vectors falling under an area of the groups included the detected global vector GV may be constructed so as to be regarded as matching this global vector GV.

Figure 11:
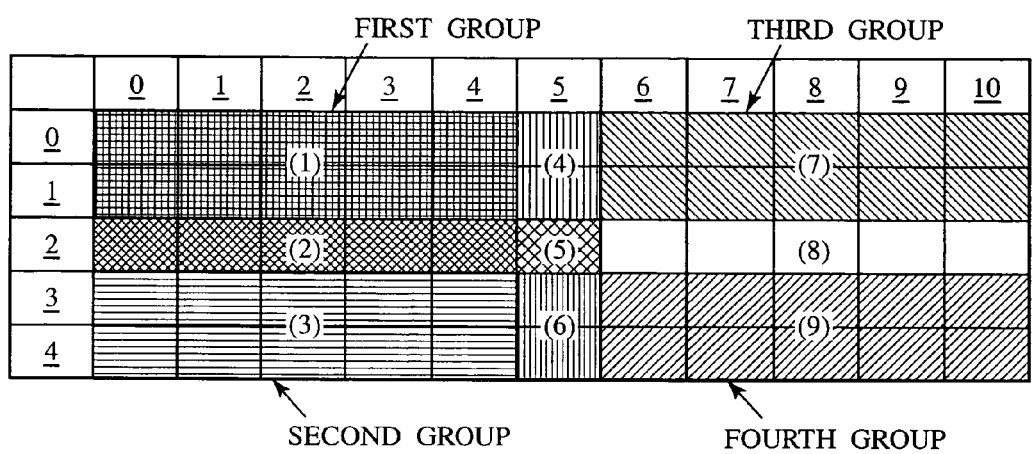
FIG. 11 is a diagram schematically showing a specific example of a method of grouping the global vectors detected by the interpolation direction histogram detector in FIG. 9.

FIG. 11 is a diagram showing a specific example of global vector GV grouping, wherein the specific example is intended to implement grouping by splitting the area of the histogram shown in FIG. 10, that is, a search area into four areas in all, two in each of horizontal and vertical directions. The thus-grouped areas, however, partly overlap one another.

As shown in FIG. 11, if areas (1) to (9) are assumed, each group is organized as follows:

A first group includes areas (1)+(2)+(4)+(5),
a second group includes areas (2)+(3)+(5)+(6),
a third group includes areas (4)+(5)+(7)+(8), and
a fourth group includes areas (5)+(6)+(8)+(9).

That is to say, area (2) is shared between the first group and the second group, area (4) is shared between the first group and the third group, area (6) is shared between the second group and the fourth group, area (8) is shared between the third group and the fourth group, and area (5) is shared by the first to fourth groups. Area (5) includes only the interpolation position $P_0$. The interpolation position $P_0$ is therefore included in all groups.

If the global vector GV lies in the first group, therefore, the candidate interpolation pixel vectors of the directions belonging to the first group will be Judged to match the global vector GV.

If there are a plurality of candidate interpolation pixel vectors satisfying the above horizontal edge conditions and matching the global vector GV in terms of direction, the candidate interpolation pixel vector determination circuit 9a may be adapted to select an interpolation pixel vector from candidate interpolation pixel vectors closer to the interpolation position $P_0$, as in the foregoing second embodiment. Otherwise, the candidate interpolation pixel vector determination circuit 9a may be adapted to select the candidate interpolation pixel vector whose distance to the interpolation position $P_0$ is closest to a distance from the global vector GV to the interpolation position $P_0$ (hereinafter, this distance is referred to as the global distance GD). In this case, the interpolation direction histogram detector 10 will calculate the global distance GD as well as the global vector GV.

A method of determining an interpolation pixel vector using the global distance GD is described here with reference to FIG. 10. If a distance L between pixels $P(i_1, j_1)$, $P(i_2, j_2)$ in FIG. 10 is defined as $$L = |i_1 - i_2| + |j_1 - j_2|$$

the distance (global distance GD) from the interpolation position $P_0$ (5, 2) to the position (5, 3) of the global vector GV can be expressed as:

$$GD = |5-5| + |3-2| = 1$$

In contrast to this, for example, if two candidate interpolation pixel vectors of positions (2, 2), (3, 4) are present that satisfy the horizontal edge conditions and match the global vector GV in terms of direction in accordance with the grouping scheme shown in FIG. 11, distances D1, D2 of the two candidate interpolation pixel vectors from the interpolation position $P_0$ can be expressed respectively as follows:

$$D1 = |2-5| + |2-2| = 3$$

$$D2 = |3-5| + |4-2| = 4$$

Since the distance of the candidate interpolation pixel vector of position (2, 2) is closer to the global distance GD, this candidate interpolation pixel vector will be selected as the interpolation pixel vector.

As can be seen from the above, in the present third embodiment, it is possible to substantially improve interpolation pixel vector selection accuracy and effectively suppress interpolation pixel vector detection errors, by knowing an approximate motion of the entire image screen and an approximate interpolation distance beforehand using a method such as constant-rate scrolling.

Figure 12:
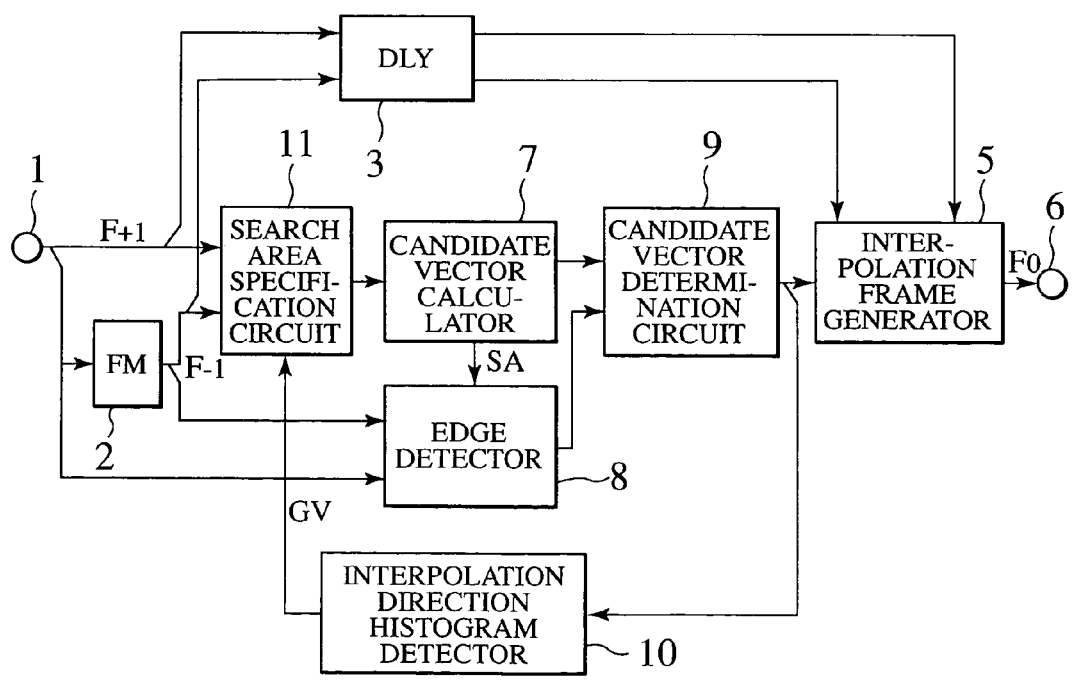
FIG. 12 is a block diagram showing a fourth embodiment of an image interpolation device according to the present invention.

FIG. 12 is a block diagram showing a fourth embodiment of an image interpolation device according to the present invention. Reference numeral 11 in FIG. 12 denotes a search area specification circuit. Sections equivalent to those shown in any one of the foregoing accompanying drawings are each assigned the same reference numeral, and description of these sections is omitted to avoid duplicate description.

In FIG. 12, a current frame $F_{-1}$ from an input terminal 1, and an immediately previous frame $F_{+1}$ from a frame memory 2 are supplied to the search area specification circuit, in which, on the basis of the global vector GV detected by an interpolation direction histogram detector 10, search areas $SA_{-1}$ and $SA_{+1}$ associated with the current frame $F_{-1}$ and the immediately previous frame $F_{+1}$, respectively, are then specified for each interpolation position for generating interpolation pixels in an interpolation frame $F_0$. In the specified search areas $SA_{-1}$, $SA+_1$, similarly to the second embodiment shown in FIG. 2, the above X number of candidate interpolation pixel vectors are selected by a candidate interpolation pixel vector calculator 7, and then on the basis of edge conditions, one interpolation pixel vector is selected from the above-selected X number of candidate interpolation pixel vectors by a candidate interpolation pixel vector determination circuit 9.

Figure 13:
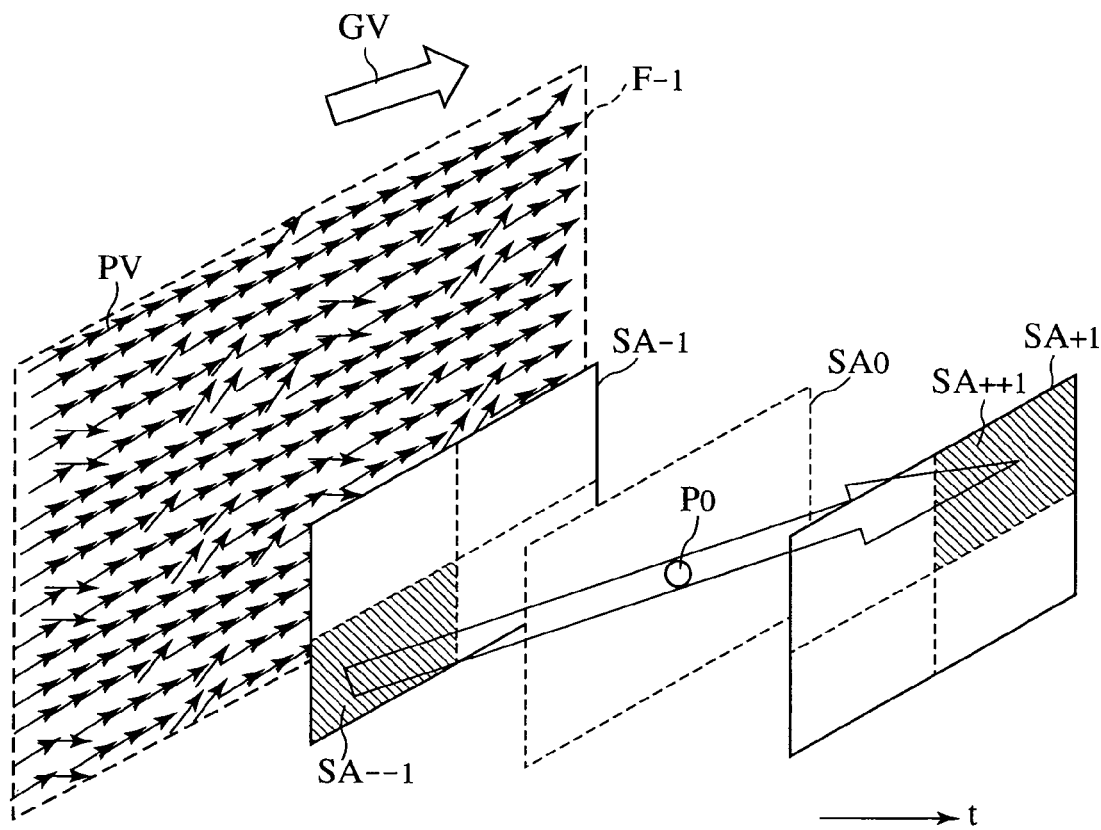
FIG. 13 is a diagram that shows operation of the search area specification circuit shown in FIG. 12.

FIG. 13 is a diagram showing a specific example of processing by the search area specification circuit 11 in FIG. 12.

In FIG. 13, an interpolation pixel vector PV associated with a central pixel in the search area is obtained for each pixel in the immediately previous frame $F_{-1}$ by the candidate interpolation pixel vector determination circuit 9. As illustrated in FIGS. 11 and 12, global vector GV is detected from the interpolation pixel vectors PVs by the interpolation direction histogram detector 10. This global vector GV is then supplied to the search area specification circuit 11, for generation of a next interpolation frame $F_0$.

First, the search area specification circuit 11 assumes an area $SA_0$ with an interpolation position $P_0$ of an interpolation pixel in an interpolation frame $F_0$ as a center, and defines an area associated with the immediately previous frame $F_{-1}$ facing the area $SA_0$, as a first-order search area $SA_{-1}$ of this frame $F_{-1}$, and an area associated with the current frame $F_{+1}$ facing the area $SA_0$ of the interpolation frame, as a first-order search area $SA_{+1}$ of this frame $F_{+1}$. Next, the search area specification circuit 11 splits each of the first-order search areas $SA_{-1}$, $SA_{+1}$ into four areas, two vertically and two horizontally. Additionally, when the global vector GV is set through the central interpolation position $P_0$ in the area $SA_0$ of the interpolation frame $F_0$, a split area in the first-order search area $SA_{-1}$ of the immediately previous frame $F_{-1}$ from the pixel vectors existing in the direction indicated by the above global vector GV, and in an opposite direction thereto, is defined as a second-order search area $SA_{--1}$. Likewise, a split area in the first-order search area $SA_{+1}$ of the current frame $F_{+1}$ is defined as a second-order search area $SA_{++1}$.

The associated second-order search area $SA_{--1}$ of the immediately previous frame $F_{-1}$ and the associated second-order search area $SAi+1$ of the current frame $F_{+1}$ are supplied to the candidate interpolation pixel vector calculator 7, which then detects the above X number of candidate interpolation pixel vectors in the second-order search areas $SA_{--1}$, $SA_{1+1}$.

While the first-order search area $SA_{-1}$, $SA_{+1}$ has been split into four areas in the present embodiment, a person skilled in the art will find it obvious that the present invention is not limited to such splitting.

As described above, the present fourth embodiment also provides effects equivalent to those of the third embodiment shown in FIG. 9, and makes it possible to reduce operands by using the candidate interpolation pixel vector calculator 7, for example, In the first embodiment of FIG. 1, the search areas in the immediately previous frame $F_{-1}$ and current frame $F_{+1}$ used during processing by minimum differential pair calculator 4 can likewise be identified, as in the present fourth embodiment, by use of the global vector GV in the search area specification circuit 11, by, similarly to the construction of FIG. 12, providing the search area specification circuit 11 at the stage immediately previous the minimum differential pair calculator 4, and/or providing the interpolation direction histogram detector 10 that detects, from the interpolation pixel vectors output from the minimum differential pair calculator 4, such global vector GV as described above.

Figure 14:
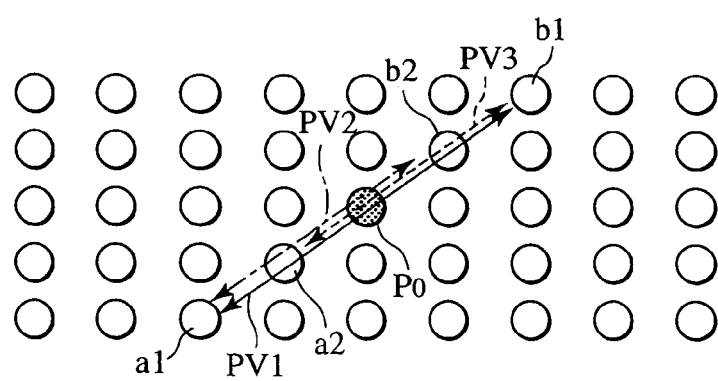
FIG. 14 is a block diagram showing a fifth embodiment of an image interpolation device according to the present invention.

FIG. 14 is a diagram that shows operation of major sections in a fifth embodiment of an image interpolation device according to the present invention. The present fifth embodiment is of a construction similar to that of each of the foregoing embodiments. It is to be understood, therefore, that when the fifth embodiment is of the construction shown in FIG. 1, FIG. 14 shows a method of detecting pixel pairs of minimum difference using a minimum differential pair calculator 4, and that when the fifth embodiment is of the construction shown in any one of FIGS. 4, 9, and 12, FIG. 14 shows a method of detecting candidate interpolation pixel vectors using a candidate interpolation pixel vector calculator 7.

In FIG. 14, an array constituted by a search area SA in an immediately previous frame $F_{-1}$, an area $SA_0$ in an interpolation frame $F_0$, and a search area $SA_{+1}$ in a current frame $F_{+1}$, is shown in perspective view so that these areas can be seen through from a direction of a time axis "t". Therefore, circle-marked pixels "a" and "b" in the search areas $SA_{-1}$ and $SA_{+1}$, respectively, are shown in overlapped form. For this reason, pixels a1, a2 are pixels belonging to the search area $SA_{-1}$ in the immediately previous frame $F_{-1}$, and pixels b1, b2 are pixels belonging to the search area $SA_{+1}$ in the current frame $F_{+1}$. Also, $P_0$ denotes an interpolation position in the interpolation frame $F_0$ or a position of a central pixel in the search area $SA_{-1}$, $SA_{+1}$.

The fifth embodiment is adapted to be able to detect candidate pixel vectors accurately and thus prevent detection errors from occurring, even if there are frame-by-frame changes in a moving speed of an image screen.

In FIG. 14, since the pixels a1 and b1 are point-symmetrical to each other with respect to the interpolation position $P_0$, these pixels are equivalent to one of the pixel pairs mentioned in any one of the foregoing embodiments. An interpolation pixel vector PV1 for this pixel pair [a1∥b1] is denoted as a solid line with an arrow. The minimum differential pair calculator 4 (FIG. 1) and the candidate interpolation pixel vector calculator 7 (FIG. 4, 9, or 12) first calculate an absolute value of the foregoing differential value (hereinafter, referred to as absolute differential value) for the pixel pair [a1∥b1].

Next, a pair formed up of one counterpart, pixel a1, to the pixel pair [a1∥b1] and the pixel b2 closer to the interpolation position $P_0$ than to the other counterpart, pixel b1, is defined as a first extended pixel pair <a1∥b2>. The single-dashed line shown in the figure denotes an interpolation pixel vector PV2 of the first extended pixel pair <a1∥b2>. The minimum differential pair calculator 4 and the candidate interpolation pixel vector calculator 7 also calculate an absolute differential value of the first extended pixel pair <a1∥b2> as a first extended absolute differential value.

Furthermore, a pair formed up of the other counterpart, pixel b1, to the pixel pair [a1∥b1] and the pixel a2 closer to the interpolation position $P_0$ than to one counterpart, pixel a1, is defined as a second extended pixel pair <a2∥b1>. The arrow with a broken line, shown in the figure, denotes an interpolation pixel vector PV3 of the second extended pixel pair <a2∥b1>. The minimum differential pair calculator 4 and the candidate interpolation pixel vector calculator 7 also calculate an absolute differential value of the first extended pixel pair <a1∥b2> as a second extended absolute differential value.

In the fifth embodiment of the construction shown in FIG. 1, of all calculated pixel pairs including the first and second extended pixel pairs, only the pixel pair with the smallest absolute differential value is selected in the minimum differential pair calculator 4. After this, similar calculations are conducted for pixel pairs point-symmetrical to the interpolation position $P_0$ in the same search area, the pixel pairs each having a minimum absolute differential value are determined for each pair, and among all pixel pairs that have thus been determined, only the pixel pair with the smallest absolute differential value is selected as the pixel pair of minimum difference.

Alternatively, the above-mentioned extended pixel pairs are determined for all pixel pairs point-symmetrical to the interpolation position $P_0$ in the search area, and among all these pixel pairs including the extended pixel pairs, only the pixel pair with the smallest absolute differential value may be selected as the pixel pair of minimum difference. Otherwise, the pixel pair having the minimum absolute differential value is determined for all pixel pairs point-symmetrical to the interpolation position $P_0$ first, then the above-mentioned extended pixel pairs are determined for the pixels of the selected pixel pair, and among all pixel pairs including the selected pixel pair and the extended pixel pairs, only the pixel pair with the smallest absolute differential value may be selected as the pixel pair of minimum difference.

Additionally, in the fifth embodiment of the construction shown in FIG. 4, 9, or 12, at the candidate interpolation pixel vector calculator 7, the first and second extended pixel pairs are determined for all pixel pairs point-symmetrical to the interpolation position $P_0$ in the search area, then among all pixel pairs including the above pixel pairs and the extended pixel pairs, the above-mentioned X number of pixel pairs are selected in ascending order of the minimum absolute differential value, and the thus-selected pixel pairs are supplied as candidate interpolation pixel vectors to the candidate vector determination circuit 9 or 9a.

In this way, in the fifth embodiment, pixel pairs point-symmetrical to the interpolation position $P_0$ in terms of positional relationship are obtained. In addition, if the moving speed of the image screen changes between the immediately previous frame $F_{-1}$ and the current frame $F_{+1}$, the interpolation pixel vectors of pixel pairs not point-symmetrical to the interpolation position $P_0$ in terms of positional relationship are also obtained according to the particular change. For these reasons, the interpolation frame further improves in accuracy.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications as fall within the ambit of the appended claims.

What is claimed is:

1. An image interpolation device that generates an interpolation frame to be interpolated between an immediately previous frame of an image signal and a current frame thereof, the image interpolation device comprising:

a candidate interpolation pixel vector calculation unit which defines, as pixel pairs, a set of pixels belonging to the immediately previous frame and the current frame and point-symmetrical to one another with respect to an interpolation position within the interpolation frame, calculates differential luminance values of the individual pixels within the pixel pairs, defines a desired number of pixel pairs in normal ascending order of the smallest absolute differential value, as candidate interpolation pixel pairs, and further calculates pixel position information of the candidate interpolation pixel pairs, as interpolation pixel vectors;

an edge detection unit which detects edge information from the immediately previous frame and the current frame;

a candidate interpolation pixel vector determination unit which, on the basis of the edge information, selects, as interpolation pixel pairs, only the candidate interpolation pixel pairs that satisfy required edge conditions, among all candidate interpolation pixel pairs that have been detected by the candidate interpolation pixel vector calculation unit; and an interpolation frame-generating unit which generates interpolation pixels associated with the interpolation position, by using interpolation pixel vectors of the interpolation pixel pairs that have been selected by the interpolation pixel vector determination unit, and thus generates an interpolation frame formed up of the interpolation pixels.

2. The image interpolation device according to claim 1, further comprising:

an interpolation direction histogram detection unit which identifies and counts the number of appearances of the interpolation pixel vectors within the interpolation pixel pairs selected by the candidate interpolation pixel vector determination unit, for each of the directions indicated by the interpolation pixel vectors, and detects a dominant direction of interpolation pixel vectors, as a direction of a global vector, according to the particular appearance count;

wherein the candidate interpolation pixel vector determination unit selects as interpolation pixel pairs, from the candidate interpolation pixel pairs that were selected by the candidate interpolation pixel vector calculation unit, only the candidate interpolation pixel pairs satisfying the edge conditions and having the same candidate interpolation pixel vector direction as a direction of either of the global vectors, and supplies interpolation pixel vectors of the selected interpolation pixel pairs to the interpolation frame generating unit.

3. The image interpolation device according to claim 2, wherein:

the interpolation direction histogram detection unit has a unit to group the detected global vectors according to the particular direction; and the candidate interpolation pixel vector determination unit determines the candidate interpolation pixel vectors whose directions are included in the groups assigned to the directions of the global vectors, as the interpolation pixel vectors matching the global vectors.

4. The image interpolation device according to claim 3, wherein:

when there are plural candidate interpolation pixel pairs satisfying the edge conditions and having the same candidate interpolation pixel vector direction as the direction of either global vector, the candidate interpolation pixel vector determination unit calculates a first distance between the pixels within the immediately previous frame or current frame that exist in the global vector direction when viewed from the interpolation position, and the central pixels within the immediately previous frame or current frame that face towards the interpolation position, and selects, from the candidate interpolation pixel vectors, the candidate interpolation pixel pair closest to the first distance in terms of the distance between the pixels of the particular candidate interpolation pixel pair and the central pixels, as the interpolation pixel pair.

5. The image interpolation device according to claim 1, wherein: the candidate interpolation pixel vector calculation unit not only defines, as the pixel pairs, a set of pixels belonging to the immediately previous frame and the current frame and point-symmetrical to one another with respect to an interpolation position within the interpolation frame, but also defines, as pixel pairs, a set constituted by the pixels of either the immediately previous frame or the current frame and by the pixels of the immediately previous frame or the current frame that are not point-symmetrical to the pixels of either the current frame or of the immediately previous frame, with respect to the interpolation position within the interpolation frame.

6. A frame rate converter that interpolates an interpolation frame that was generated by the image interpolation device according to claim 1, between the immediately previous frame and the current frame, and thus changes a frame rate of the image signal.

7. An image display apparatus that makes an image display of the image signals whose frame rate was changed by the frame rate converter according to claim 6.

8. An image interpolation device that generates an interpolation frame to be interpolated between an immediately previous frame of an image signal and a current frame thereof, the image interpolation device comprising:

a search area specification unit which specifies, in each of the immediately previous frame and the current frame, a search area with respect to an interpolation position within the interpolation frame;

a candidate interpolation pixel vector calculation unit which defines, as pixel pairs, a set of pixels belonging to the immediately previous frame and the current frame, existing in the search areas specified by the search area specification unit, and point-symmetrical to one another with respect to an interpolation position within the interpolation frame, calculates differential luminance values of the individual pixels within the pixel pairs, defines a desired number of pixel pairs in normal ascending order of the smallest absolute differential value, as candidate interpolation pixel pairs, and further calculates pixel position information of the candidate interpolation pixel pairs, as interpolation pixel vectors;

an edge detection unit which detects edge information from the immediately previous frame and the current frame;

a candidate interpolation pixel vector determination unit which, on the basis of the edge information, selects, as interpolation pixel pairs, only the candidate interpolation pixel pairs that satisfy required edge conditions, among all candidate interpolation pixel pairs that have been detected by the candidate interpolation pixel vector calculation unit;

an interpolation frame generating unit which generates interpolation pixels associated with the interpolation position, by using interpolation pixel vectors of the interpolation pixel pairs that have been selected by the interpolation pixel vector determination unit, and thus generates an interpolation frame formed up of the interpolation pixels; and an interpolation direction histogram detection unit which, for each of the directions indicated by the interpolation pixel vectors, identifies and counts the number of appearances of the interpolation pixel vectors within the interpolation pixel pairs selected by the candidate interpolation pixel vector determination unit, and detects a dominant direction of interpolation pixel vectors as a direction of a global vector according to the particular appearance count;

wherein the search area specification unit sets the search areas in the global vector direction detected from the interpolation position of the interpolation frame by the interpolation direction histogram detection unit.

9. A frame rate converter that interpolates an interpolation frame that was generated by the image interpolation device according to claim 8, between the immediately previous frame and the current frame, and thus changes a frame rate of the image signal.

10. An image display apparatus that makes an image display of the image signals whose frame rate was changed by the frame rate converter according to claim 9.

11. An image interpolation device that generates an interpolation frame to be interpolated between an immediately previous frame of an image signal and a current frame thereof, the image interpolation device comprising:

a minimum differential pixel pair calculation unit which defines, as pixel pairs, a set of pixels belonging to the immediately previous frame and the current frame and point-symmetrical to one another with respect to an interpolation position within the interpolation frame, calculates differential luminance values of the individual pixels within the pixel pairs, and with the pixel pair of the smallest absolute differential value as a pixel pair of minimum difference, further calculates pixel position information of the pixel pair of minimum difference as an interpolation pixel vector, and an interpolation frame-generating unit which, by using the interpolation pixel vector, generates interpolation pixels associated with the interpolation position and thus generates an interpolation frame formed up of the interpolation pixels, the minimum differential pixel pair calculation unit not only defines, as the pixel pairs, a set of pixels belonging to the immediately previous frame and the current frame and point-symmetrical to one another with respect to an interpolation position within the interpolation frame, but also defines, as pixel pairs, a set constituted by the pixels of either the immediately previous frame or the current frame and by the pixels of the immediately previous frame or the current frame that are not point-symmetrical to the pixels of either the current frame or of the immediately previous frame, with respect to the interpolation position within the interpolation frame.

12. The image interpolation device according to claim 11, wherein the minimum differential pixel pair calculation unit operates to:

for each of the immediately previous frame and the current frame, define a pixel facing the interpolation position within the interpolation frame, as a central pixel, and set a search area for a desired number of pixels, in horizontal and vertical directions with the central pixel as a center; and define a pixel pair formed up of the pixels located at point-symmetrical positions with respect to the interpolation position, within the search area of the immediately previous frame and the search area of the current frame.

13. The image interpolation device according to claim 11, wherein:

the interpolation frame-generating unit determines values of interpolation pixels on the basis of the pixel data forming the pixel pair of minimum difference derived from the interpolation pixel vector, and generates the interpolation frame formed up of the interpolation pixels.

14. The image interpolation device according to claim 13, wherein: the values of the interpolation pixels are luminance values commensurate with the luminance values of the pixels forming the pixel pair of minimum difference, and chroma values commensurate with the luminance values.

15. A frame rate converter that interpolates an interpolation frame that was generated by the image interpolation device according to claim 11, between the immediately previous frame and the current frame, and thus changes a frame rate of the image signal.

16. An image display apparatus that makes an image display of the image signals whose frame rate was changed by the frame rate converter according to claim 15.

17. An image interpolation device that generates an interpolation frame to be interpolated between an immediately previous frame of an image signal and a current frame thereof, the image interpolation device comprising:

a minimum differential pixel pair calculation unit which defines, as pixel pairs, a set of pixels belonging to the immediately previous frame and the current frame and point-symmetrical to one another with respect to an interpolation position within the interpolation frame, calculates differential luminance values of the individual pixels within the pixel pairs, and with the pixel pair of the smallest absolute differential value as a pixel pair of minimum difference, further calculates pixel position information of the pixel pair of minimum difference as an interpolation pixel vector;

an interpolation frame-generating unit which, by using the interpolation pixel vector, generates interpolation pixels associated with the interpolation position and thus generates an interpolation frame formed up of the interpolation pixels, and a minimum differential pixel pair calculation unit which defines, as pixel pairs, a set of pixels belonging to the immediately previous frame and the current frame and point-symmetrical to one another with respect to an interpolation position within the interpolation frame, calculates differential R-, G-, and B-values of the individual pixels within the pixel pairs, and with the pixel pair of the smallest absolute differential value as a pixel pair of minimum difference, further calculates pixel position information of the pixel pair of minimum difference as an interpolation pixel vector; and an interpolation frame-generating unit which, by using the interpolation pixel vector, generates interpolation pixels associated with the interpolation position, and thus generates an interpolation frame formed up of the interpolation pixels, wherein the minimum differential pixel pair calculation unit not only defines, as the pixel pairs, a set of pixels belonging to the immediately previous frame and the current frame and point-symmetrical to one another with respect to an interpolation position within the interpolation frame, but also defines, as pixel pairs, a set constituted by the pixels of either the immediately previous frame or the current frame and by the pixels of the immediately previous frame or the current frame that are not point-symmetrical to the pixels of either the current frame or of the immediately previous frame, with respect to the interpolation position within the interpolation frame.

18. The image interpolation device according to claim 17, wherein the minimum differential pixel pair calculation unit operates to:

for each of the immediately previous frame and the current frame, define a pixel facing the interpolation position within the interpolation frame, as a central pixel, and set a search area for a desired number of pixels, in horizontal and vertical directions with the central pixel as a center; and define a pixel pair formed up of the pixels located at point-symmetrical positions with respect to the interpolation position, within the search area of the immediately previous frame and the search area of the current frame.

19. The image interpolation device according to claim 17, wherein: the interpolation frame-generating unit defines average R-, G-, and B-values of the interpolation pixel pair of the smallest absolute differential value, as values of interpolation pixels present at the interpolation position, and generates the interpolation frame.

20. A frame rate converter that interpolates an interpolation frame that was generated by the image interpolation device according to claim 17, between the immediately previous frame and the current frame, and thus changes a frame rate of the image signal.

21. An image display apparatus that makes an image display of the image signals whose frame rate was changed by the frame rate converter according to claim 20.

* * * * *